US008447984B1

(12) United States Patent
Siegel et al.

(10) Patent No.: US 8,447,984 B1
(45) Date of Patent: May 21, 2013

(54) AUTHENTICATION SYSTEM AND METHOD FOR OPERATING THE SAME

(75) Inventors: Ellen H. Siegel, San Carlos, CA (US); Dwight F. Hare, Encinitas, CA (US); Tanjore S. Ravishankar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2411 days.

(21) Appl. No.: 10/877,743

(22) Filed: Jun. 25, 2004

(51) Int. Cl.
*H04L 9/32* (2006.01)

(52) U.S. Cl.
USPC .......................................... 713/173; 713/185

(58) Field of Classification Search
USPC .......................................................... 713/185
See application file for complete search history.

(56) References Cited

U.S. PATENT DOCUMENTS

| 6,005,942 | A * | 12/1999 | Chan et al. ..................... 713/187 |
| 6,607,136 | B1 * | 8/2003 | Atsmon et al. ................. 235/492 |
| 2001/0054155 | A1 * | 12/2001 | Hagan et al. ................... 713/193 |
| 2002/0165824 | A1 * | 11/2002 | Micali ............................. 705/50 |
| 2003/0145205 | A1 * | 7/2003 | Sarcanin ........................ 713/172 |

* cited by examiner

*Primary Examiner* — Cordelia Zecher
(74) *Attorney, Agent, or Firm* — Martine Penilla Group, LLP (57) ABSTRACT

A challenge string is sent from a server to an authentication card. The challenge string is encrypted using a private key on the authentication card. Then, the encrypted challenge string is sent as a response from the authentication card to the server. A unique identifier of the authentication card is correlated to a user record residing at the server to obtain an authentication certificate from within the user record. The authentication certificate includes a public key. The public key from the authentication certificate is used to decrypt the response at the server. A determination is then made as to whether the decrypted response matches the challenge string as originally sent from the server to the authentication card. If the decrypted response matches the original challenge string, the authentication is successful. Otherwise, the authentication fails.

25 Claims, 4 Drawing Sheets

Fig. 4

AUTHENTICATION SYSTEM AND METHOD FOR OPERATING THE SAME

CROSS REFERENCE TO RELATED APPLICATIONS

This application is related to U.S. patent application Ser. No. 10/877,350, entitled "Method for Using Java Servlets as a Stack Based State Machine," and U.S. patent application Ser. No. 10/877,842, entitled "Server Authentication in Non-Secure Channel Card Pin Reset Methods and Computer Implemented Processes," both filed on an even date with the present application. The disclosure of each related application identified above is incorporated herein by reference.

BACKGROUND

Controlling access to computing resources and data is of major importance in today's digital security environment. Without sufficient security measures to restrict access to authorized entities, sensitive data and resources can be compromised beyond recovery. Thus, a recognized need exists for strong authentication mechanisms to control access to vulnerable computing domains. However, implementation of many currently available strong authentication mechanisms requires expensive and complex security system deployments, thus deterring implementation by many entities that could benefit from stronger authentication.

For example, Public Key Infrastructure (PKI) represents a set of standards for creating, storing, and managing asymmetric keys that can be used for authentication. Though PKI provides strong authentication, security consumer adoption of PKI has been limited due to the significant expense and complexity of PKI deployment. Therefore, security consumers have been traditionally required to choose between weak single factor authentication, e.g., username/password only, or stronger authentication, e.g., PKI, involving complex and expensive deployments. Consequently, a need exists for an authentication mechanism that is stronger than single factor and does not require the complex and expensive deployment of PKI.

SUMMARY

It should be appreciated that the present invention can be implemented in numerous ways, such as a process, an apparatus, a system, a device or a method on a computer readable medium. Several inventive embodiments of the present invention are described below.

In one embodiment, an authentication system is disclosed. The authentication system includes an authentication card that has a unique identifier. The authentication card is configured to include a private portion of an authentication keypair. The authentication system also includes a card reader capable of interfacing with the authentication card. The card reader is configured to access information stored on the authentication card. The authentication system further includes a client computing system and a server computing system. The client computing system is connected to communicate with the card reader. The server computing system is connected to communicate with the client computing system. The server computing system includes a memory defined to include a user record. The user record includes the unique identifier of the authentication card and an authentication certificate having a public portion of the authentication keypair. The server is configured to transmit a challenge string to the authentication card. The authentication card is configured to encrypt the challenge string using the private portion of the authentication keypair and transmit the encrypted challenge string to the server as a response. The server is further configured to decrypt the response using the public portion of the authentication keypair. Additionally, the server is configured to determine if the decrypted response matches the challenge string transmitted to the authentication card. A successful match indicates a successful authentication. Conversely, an unsuccessful match indicates an unsuccessful authentication.

In another embodiment, a method for establishing an authentication system is disclosed. The method includes provisioning an authentication card that has a unique identifier. The authentication card is provisioned with a private portion of an authentication keypair and an authentication certificate that includes a public portion of the authentication keypair. The method also includes assigning the authentication card to an entity having a user record in an identity server. Additionally, the method includes storing the unique identifier of the authentication card in the user record of the entity to which the authentication card is assigned. A method operation is also provided for extracting the authentication certificate from the authentication card. Then, the authentication certificate is stored in the user record of the entity to which the authentication card is assigned. The method further includes activating the authentication card for runtime use.

In another embodiment, a method for performing authentication is disclosed. The method includes sending a challenge string from a server to an authentication card. At the authentication card, a private key on the authentication card is used to encrypt the challenge string. The method continues with an operation for sending the encrypted challenge string as a response from the authentication card to the server. The method further includes correlating a unique identifier of the authentication card to a user record residing at the server to obtain an authentication certificate from within the user record, wherein the authentication certificate includes a public key. Then, the public key from the authentication certificate is used at the server to decrypt the response as received from the authentication card. The method continues with an operation for determining if the decrypted response matches the challenge string as sent from the server to the authentication card. If the match is successful, the authentication is successful. Otherwise, the authentication is unsuccessful.

In another embodiment, a computer readable media including program instructions for performing authentication is disclosed. The computer readable media includes program instructions for sending a challenge string from a server to an authentication card. Program instructions are also provided for using a private key on the authentication card to encrypt the challenge string. Further program instructions are provided for sending the encrypted challenge string as a response from the authentication card to the server. The computer readable media also includes program instructions for correlating a unique identifier of the authentication card to a user record residing at the server to obtain an authentication certificate from within the user record, wherein the authentication certificate includes a public key. Additional program instructions are provided for using the public key from the authentication certificate to decrypt the response at the server. Further program instructions are provided for determining if the decrypted response matches the challenge string as sent from the server to the authentication card, wherein a successful match results in a successful authentication. Otherwise, an unsuccessful match results in an unsuccessful authentication.

In another embodiment, an authentication system is disclosed. The authentication system includes means for sending a challenge string from a server to an authentication card.

Means are also provided for using a private key on the authentication card to encrypt the challenge string at the authentication card. The authentication system also includes means for sending the encrypted challenge string as a response from the authentication card to the server. Additionally, means are provided for correlating a unique identifier of the authentication card to a user record residing at the server to obtain an authentication certificate from within the user record, wherein the authentication certificate includes a public key. The authentication system also includes means for using the public key from the authentication certificate to decrypt the response at the server. Means are further provided for determining if the decrypted response matches the challenge string as sent from the server to the authentication card, wherein a successful match results in a successful authentication. Otherwise, an unsuccessful match results in an unsuccessful authentication.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
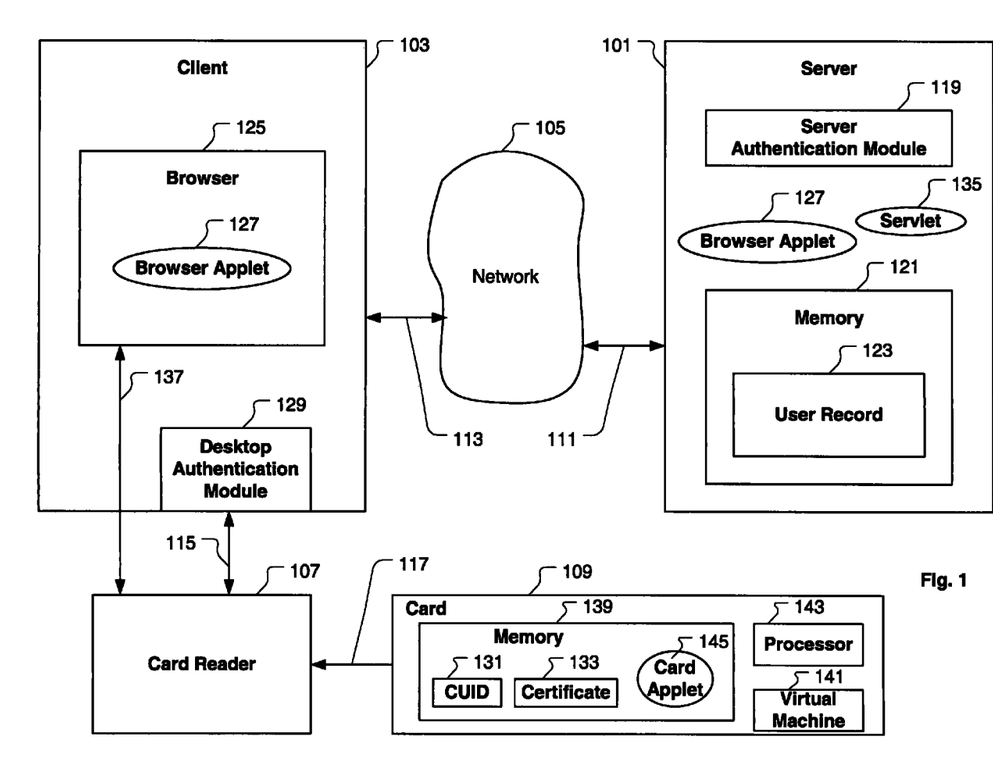
FIG. 1 is an illustration showing an authentication system, in accordance with one embodiment of the present invention.

FIG. 1 is an illustration showing an authentication system, in accordance with one embodiment of the present invention. The authentication system includes an identity server ("server") 101, a client computer system ("client") 103, a card reader 107, and an authentication card ("card") 109. The server 101 is configured to communicate with a network 105 through a connection 111. Also, the client is configured to communicate with the network 105 through a connection 113. Hence, the server 101 and the client 103 can communicate with each other through connections 111/113 and the network 105. In one embodiment, communication through the network 105 can be performed using a secure protocol, e.g., Secure Sockets Layer (SSL). Each of the server 101 and the client 103 represents an independent computing platform. Therefore, it should be appreciated that each of the server 101 and the client 103 can include a number of other components not explicitly shown in the exemplary authentication system of FIG. 1. For example, each of the server 101 and the client 103 includes a processor. Additionally, both the server 101 and the client 103 can include other common computer components and peripheral devices, such as storage components, display components, user interface components, etc. It should also be appreciated that, in various embodiments, the network 105 can be defined in accordance with a wireless network, a physical network, or a combination thereof, as known to those skilled in the art.

In one embodiment, the client 103 includes a desktop authentication module 129 configured to interface with the card reader 107 through a connection 115. It should be appreciated that the connection 115 can be implemented using either a physical connection, a wireless connection, or a combination thereof. The desktop authentication module 131 provides the client 103 with the necessary functionality to perform the authentication process in accordance with the present invention, as will be described below. In one embodiment, the desktop authentication module 131 is also configured to retrieve a user identifier from the server 101 to determine which user is attempting to login. The desktop authentication module 131 represents customized software defined to enable implementation of the authentication method of the present invention within a particular desktop authentication framework. Examples of desktop authentication frameworks for which the desktop authentication module 131 can be configured include a Pluggable Authentication Module (PAM) framework and a Windows Graphical Identification and Authentication (GINA)/Cryptographic Service Provider (CSP) framework.

In another embodiment, the client 103 includes a browser 125 configured to interface with the card reader 107 through a connection 137. The browser 125 is capable of executing one or more browser applets 127 having been downloaded from the server 101. In one embodiment, the browser applets 127 are downloaded from the server 101 to the client 103 when a user navigates the browser 125 to a web page containing the browser applets 127. In a manner similar to the desktop authentication module 129, the browser applets 127 provide the client 103 with the necessary functionality to perform the authentication process in accordance with the present invention, as will be described below. It should be appreciated that that client 103 can be configured to provide both or either of the browser 125 and desktop authentication module 129 for performing the authentication process of the present invention. With both the browser 125 and the desktop authentication module 129, communication can be performed using the Hypertext Transfer Protocol (HTTP).

Both the card reader 107 and the card 109 are configured to communicate with each other through an interface represented by an arrow 117. In one embodiment, the interface 117 is defined as a physical interface to enable the card 109 to be physically connected to the card reader 107. In this embodiment, communication occurs through physical connections between the card 109 and the card reader 107. In another embodiment, the interface 117 is defined as a wireless interface to enable the card 109 to communicate with the card reader 107 without direct physical contact. It should be appreciated that the authentication process of the present invention can be effectively implemented regardless of the specific embodiments used to define connections between the server 101, the client 103, the card reader 107, and the card 109.

The server 101 represents a back-end of the authentication system. Therefore, the server 101 is configured to include an authentication module 119 and one or more servlets 135 defined to provide necessary functionality required of the back-end of the authentication system. The functionality provided by the authentication module 119 can be resident on the server 101 as either software, hardware, firmware, or a combination thereof. Regardless of the specific embodiment of the authentication module 119, it should be understood that the authentication module 119 is defined to provide the necessary server 101 functionality required to orchestrate the authentication process of the present invention. Additionally, the server 101 includes a memory 121. The memory 121 is defined to include a user record 123 to be utilized in conjunction with the authentication process of the present invention, as will be further described below.

Other than allowing a personal identification number (MN) to be set, the card 109 effectively functions in a read-only manner for authentication purposes. Therefore, the card 109 is equipped with necessary authentication components at the time of manufacture, wherein manufacture is defined as card loading prior to delivery to an entity that will deploy the authentication system. For example, each card 109 is loaded with the necessary authentication components before delivery to a company intending to deploy the authentication system. Therefore, the customer, i.e., card consumer, is not required to have implemented complex and expensive authentication infrastructure, e.g., PKI infrastructure, prior to deployment of the authentication system of the present invention. For example, the card is provisioned with a number of card applets 145, i.e., authentication applets, authentication credentials, and other required data, except for the PIN. Therefore, the card 109 serves as a physically secure container for authentication credentials. The authentication credentials include an authentication keypair, i.e., a public key and a private key, and an authentication certificate ("certificate") 133. In one embodiment, one instance of the private key exists and resides on the card 109. Also, in one embodiment, the public key is provided within the certificate 133.

Furthermore, the card also includes a processor 143 and a memory 139. The card applets 145 are defined to execute in conjunction with a virtual machine 141 which in turn operates in conjunction with the processor 143. The card applets 145 are placed on the card 109 when the card is provisioned. The card applets 145 are executed on the card 109 and do not leave the card 109. The memory 139 can be used to store the authentication credentials and the card applets 145. At the time of manufacture, each card 109 is assigned to have a card unique identifier (CUID) 131. Also, during card provisioning, each card 109 is loaded with the certificate 133 to be used during the authentication process. As will be discussed in more detail below, the certificate 133 includes a public portion of an authentication keypair, i.e., the public key, to be used during the authentication process. Also, since the end user of the card 109 is not known at the time of manufacture, the certificate 133 is keyed to the corresponding CUD 131. Hence, with respect to the end user of the card 109, the certificate 133 is characterized as being "anonymous." In one embodiment, the certificate 133 is an x.509 certificate, wherein the CUID 131 is loaded in an identifier field of the x.509 certificate. In one embodiment, the card 109 is a Java Card defined to be compliant with Java Card Enterprise Software. In this embodiment, the card 109 may be configured to include functionality beyond what is necessary for the authentication process of the present invention.

Figure 2:
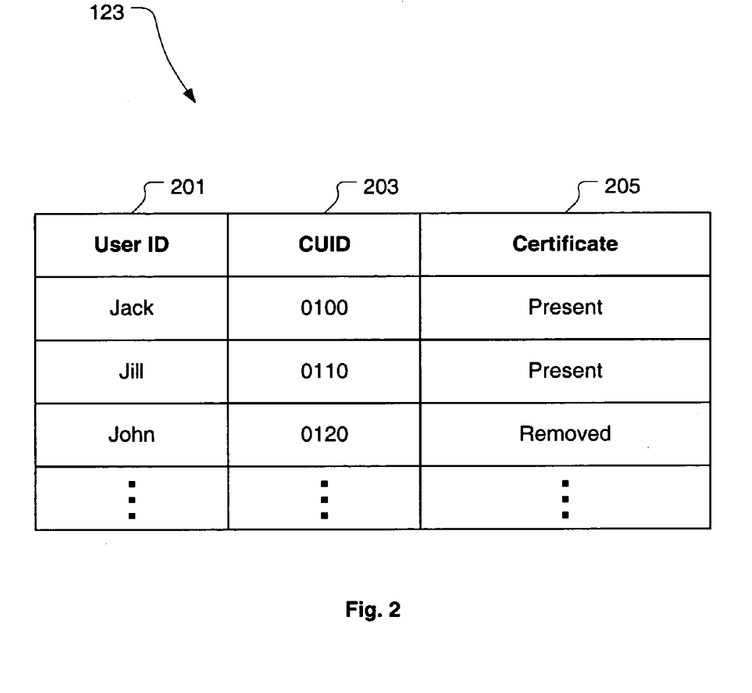
FIG. 2 is an illustration showing an exemplary user record, in accordance with one embodiment of the present invention.

Prior to using the authentication system, a lightweight enrollment process is necessary to link the anonymous certificate 133 with the appropriate cardholder, i.e., user, and activate the card 109. A first operation in the enrollment process requires association of the card 109 with the user. FIG. 2 is an illustration showing an exemplary user record 123, in accordance with one embodiment of the present invention. As previously discussed, the user record 123 is stored in the memory 121 on the server 101. In one embodiment, the user record 123 is defined to include a list of user identifiers 201. The CUID 131 of the card 109 assigned to a particular user is included in the user record 123 corresponding to the particular user, as shown by CUID entries 203 in FIG. 2. For example, FIG. 2 shows three users (Jack, Jill, and John) listed in the user record 123. Each user is assigned a different card 109. The CUID of the card assigned to each user is entered in the user record. With respect to the example of FIG. 2, Jack, Jill, and John are assigned cards having CUIDs 0100, 0110, and 0120, respectively. In one embodiment, the CUID of the card assigned to each user is manually entered into the user record by a security system administrator, wherein the security system administrator is assigned privileged access to the user record.

Following entry of the user and corresponding CUID in the user record, the enrollment process can proceed by having the user login to the authentication system through an enrollment login mechanism. In one embodiment, the enrollment login mechanism represents a pre-existing authentication system, e.g., username/password, that serves to inform the authentication system as to who the user is and which entry in the user record is to be accessed for the current enrollment operation. For discussion purposes, the user performing the enrollment process is referred to as the enrollee. A check of the CUID as entered in the user record of the enrollee is made against the CUID stored on the card being presented. If the CUD in the user record is confirmed to match the CUD stored on the card, the enrollment process continues. Otherwise, the enrollment process is aborted.

Following confirmation of the CUID, the enrollment process continues with extraction from the card of the certificate including the public key. The extracted certificate is stored in the user record as corresponding to the enrollee. For example, with respect to FIG. 2, a certificate entry 205 is associated with each user identifier 201. If the user has been successfully enrolled and has current authentication privilege, the certificate will be present in the appropriate user entry of the user record 123. Placement of the certificate in the appropriate user entry of the user record 123 makes an association between, i.e., binds, the certificate and the user. Therefore, binding of the "anonymous" certificate and the user is accomplished through a combination of placing the CUID and the corresponding certificate in the appropriate user entry of the user record. It should be appreciated that a card considered separately from the authentication system does not provide information about the user to which the card is assigned. The authentication system is necessary to associate the CUID with its corresponding user. The enrollment process further includes activation of the card for runtime use. Activation of the card involves setting state variables on both the server and the card, in addition to setting a PIN in the card. The card can be activated when 1) the certificate is properly stored in the user record corresponding to the enrollee, 2) states on both the server and the card are appropriately updated, and 3) the card PIN is set. Following a successful enrollment, the user can use the card for secure desktop and/or web authentication.

The authentication system of the present invention implements a two-factor authentication process. A first factor in the two-factor authentication process is possession of the card 109 by the user, wherein the card is appropriately provisioned and has its CUID 131 entered in the user record 123 on the server 101. A second factor in the two-factor authentication process is possession of a PIN required to access, i.e., open, the card 109 to perform the authentication process. Thus, the first and second factors represent something the user has and knows, respectively. Once the card 109 is successfully opened by the user, via the PIN, the authentication system of the present invention implements a challenge-response authentication protocol for validating the user. In the challenge-response protocol, a random challenge string is sent from the server 101 to the card 109 via the client 103. The private key, stored only on the card 109, is used to encrypt the random challenge string. Since the private key cannot leave the card 109, one or more card applets 145 residing on the card 109 are defined to perform the encryption of the random challenge string on the card 109 using the private key. The encrypted version of the random challenge string is sent back to the server 101. The server 101 then uses the public key, obtained from the certificate stored in the appropriate user entry of the user record 123, to decrypt the encrypted version of the random challenge string. If the decrypted challenge string matches the challenge string originally sent from the server 101 to the card 109, the authentication is successful. Otherwise, the authentication fails.

With respect to FIG. 1, the server 101, the authentication module 119, the network 105, the client 103, and the card reader 107 represent means for sending a challenge string from a server to a card. The card 109 and various card applets 145 represent means for using a private key to encrypt the challenge string at the card. The card 109, card reader 107, client 103, and network 105 represent means for sending the encrypted challenge string as a response from the card to the server. The authentication module 119, memory 121, and user record 123 represent means for correlating a unique identifier of the authentication card to a user record residing at the server to obtain an authentication certificate including a public key located in a certificate within the user record. The authentication module 119 represents means for using the public key from the authentication certificate to decrypt the response at the server. Also, the authentication module 119 represents means for determining if the decrypted response matches the challenge string as sent from the server to the card, wherein a successful match results in a successful authentication and an unsuccessful match results in an unsuccessful authentication.

With the authentication system of the present invention, a successful authentication is possible if the following four criteria are satisfied:
1) the card is provisioned with appropriate authentication applets and credentials;
2) the user knows the PIN required to open the card and access the authentication applets and credentials;
3) the user has an entry in the user record on the identity server; and
4) the user's entry in the user record includes attributes that match the CUID and credentials on the card being presented by the user.

If any of the above four criteria are not satisfied, the authentication will fail. In particular removing the certificate from the user's entry in the user record will effectively revoke authentication privileges for the user. Therefore, the authentication system of the present invention provides for revocation of authentication privileges by removing the certificate from the user's entry in the user record on the server. For example, with respect to FIG. 2, authentication privilege for John is revoked due to removal of the appropriate certificate from the user entry for John in the user record 123. It should be appreciated that the revocation mechanism provided by the present invention does not require interaction with a Certificate Revocation List (CRL), an Online Certificate Status Protocol (OCSP), or other conventional certificate validation entity. Therefore, it should be further appreciated that the authentication system of the present invention can be implemented without deployment of complex and expensive functionality conventionally required to interface with various conventional certificate validation entities. More specifically, the present invention requires interaction with a Certificate Authority during manufacturing of the card when the certificate is keyed to the CUID and loaded onto the card. However, once the card is manufactured, further interaction with the Certificate Authority is not required.

Figure 3:
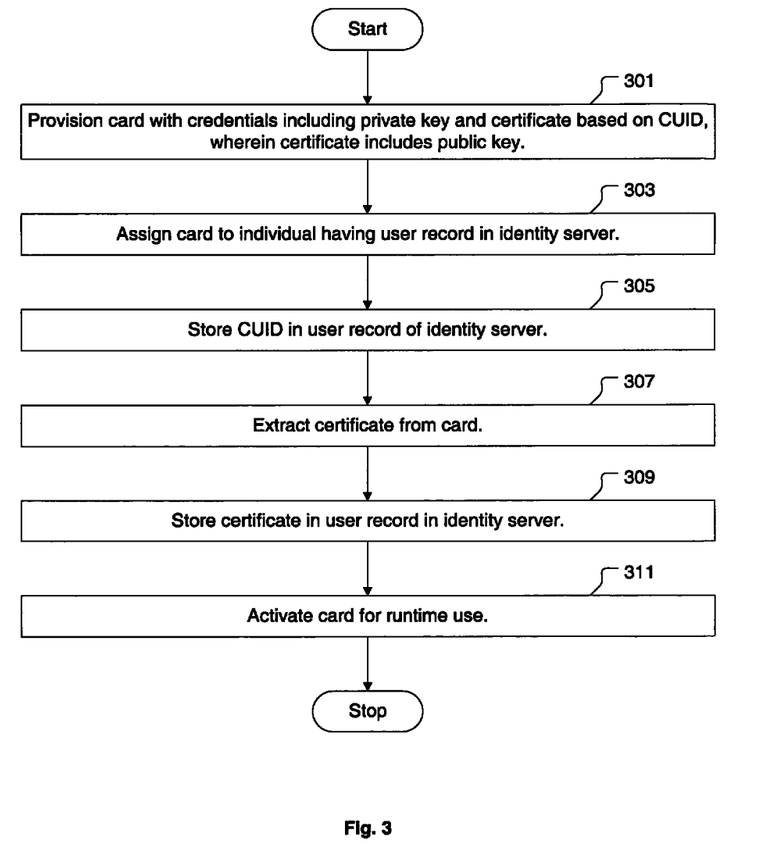
FIG. 3 is an illustration showing a flowchart of a method for establishing an authentication system, in accordance with one embodiment of the present invention.

FIG. 3 is an illustration showing a flowchart of a method for establishing an authentication system, in accordance with one embodiment of the present invention. The method includes an operation 301 for provisioning an authentication card with credentials to be used in an authentication process. In one embodiment, the authentication card is Java Card configured using Java Card Enterprise Software. The authentication card is assigned a unique identifier to be used in the authentication process. The credentials with which the card is provisioned include a private portion, i.e., private key, of an authentication keypair and an authentication certificate, wherein the authentication certificate includes a public portion, i.e., public key, of the authentication keypair. The authentication certificate is defined as an anonymous certificate that is keyed to the unique identifier of the authentication card. In one embodiment, the authentication certificate is an x.509 certificate, wherein the unique identifier of the authentication card is used to complete an identifier field of the x.509 certificate. The authentication card is further provisioned with other components required by the authentication process. For example, the authentication card can be provisioned to include one or more applets defined to operate, in conjunction with a virtual machine resident on the card, to direct authentication operations. It should be understood that the operation 301 for provisioning the authentication card is completed prior to distribution of the authentication card to an entity that will deploy the authentication system.

The method continues with an operation 303 in which the authentication card is assigned to an individual, i.e., user, having a user record in an identity server. In an operation 305, the unique identifier of the authentication card is stored in the user record of the individual to which the authentication card is assigned. The method further includes operations 307, 309, and 311, which together represent an authentication enrollment portion of the method. In one embodiment, the user is required to successfully complete an enrollment login to proceed with the enrollment portion of the method. In an exemplary embodiment, the enrollment login can include requiring the user to submit a username and password to an existing access security mechanism. Once the user has successfully completed the enrollment login, the authentication system will be aware of the user's identity, and thus be able to correlate the user to the appropriate user record in the identity server.

During enrollment, an operation 307 is performed to extract the authentication certificate from the authentication card. Then, in an operation 309, the extracted authentication certificate is stored in the user's entry in the user record on the identity server. The method further includes an operation 311 for activating the authentication card for runtime use. In one embodiment, the operation 311 is performed by setting state variables in both the identity server and authentication card and setting a PIN in the authentication card. Subsequently, submittal of the PIN by the user will be required to access the authentication components stored on the authentication card. Thus, following enrollment, the PIN enables access to information contained within the authentication card.

Figure 4:
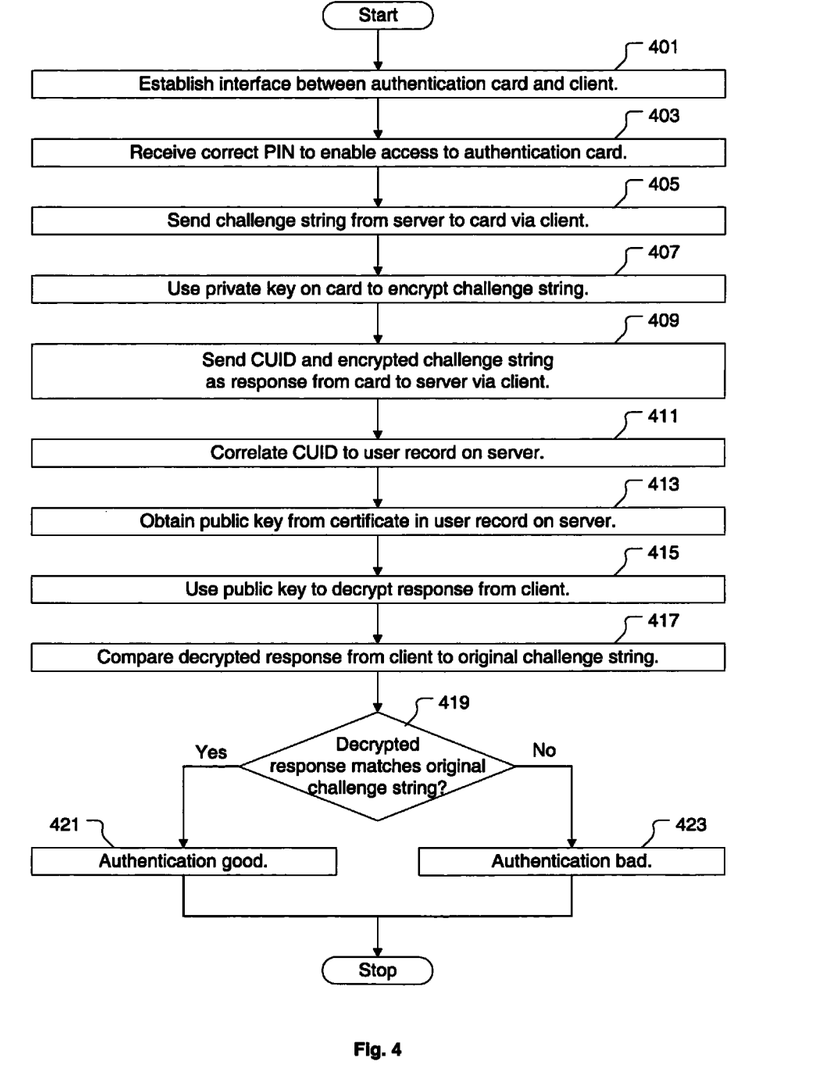
FIG. 4 is an illustration showing a flowchart of a method for performing authentication, in accordance with one embodiment of the present invention.

FIG. 4 is an illustration showing a flowchart of a method for performing authentication, in accordance with one embodiment of the present invention. The method includes an operation 401 for establishing an interface between an authentication card and a client. In one embodiment, the authentication card is defined as a Java Card compliant with a Java Card Enterprise Software. In an operation 403 a correct PIN is received to enable access to the authentication card and its authentication process functionality.

Once the authentication process functionality of the authentication card is accessed, the method for performing authentication continues with an operation 405 in which a challenge string is sent from a server to the authentication card via the client. In one embodiment the challenge string is a random challenge string generated at the time of authentication. In one embodiment, browser applets having been downloaded from the server to the client are executed within a browser of the client to broker communication between the server and the authentication card. In another embodiment, a desktop authentication module present on the client is defined to broker communication between the server and the authentication card.

The server is configured to operate as an identity server. Thus, the server is equipped with the necessary functionality to perform server-side duties within the authentication process. The method continues with an operation 407 in which a private key residing on the authentication card is used to encrypt the challenge string at the authentication card. It should be appreciated that the private key residing on the authentication card represents the only existing instance of the private key and cannot be removed from the authentication card. Following completion of the operation 407, an operation 409 is performed to send the encrypted challenge string as a response from the authentication card to the server via the client.

The method also includes an operation 411 in which a unique identifier of the authentication card, i.e., CUID, is correlated to a user record residing at the server. The correlation of operation 411 enables an operation 413 to be performed to obtain an authentication certificate from the user record, wherein the authentication certificate includes a public key. In one embodiment, a signature of the authentication certificate is validated against a set of trusted signer certificates local to the server, wherein each signer certificate corresponds to a trusted Certificate Authority empowered to sign the authentication certificates corresponding to the authentication cards in the particular authentication system deployment. It should be appreciated, however, that validating the signature of the authentication certificate against the set of trusted signer certificates local to the server does not require remote validation/communication with a Certificate Authority.

The authentication certificate is defined as an anonymous certificate keyed to the unique identifier of the authentication card. In one embodiment, the authentication certificate is an x.509 certificate. Once the public key is obtained from the authentication certificate, the method includes an operation 415 for using the public key from the authentication certificate to decrypt the response at the server, wherein the response represents the encrypted version of the challenge string as received back from the authentication card at the server. Again, use of the public key in the operation 415 is not contingent on validation of the authentication certificate with a Certificate Authority.

In accordance with the operations 413 and 415, the public key included within the authentication certificate is essential for successful authentication to occur. Therefore, in one embodiment, the method of FIG. 4 provides for revocation of an authentication privilege by removing the authentication certificate from the user record residing at the server. An absence of the certificate in the appropriate user record in the operation 413 will prevent the public key from being obtained. Without the public key, the encrypted challenge cannot be decrypted by the server in the operation 415, thus causing the authentication process to abort.

The method further includes an operation 417 in which the decrypted response resulting from the operation 415 is compared to the original challenge string sent from the server to the authentication card. Then, in an operation 419, a decision is made as to whether the comparison of operation 417 yields a match. If the decrypted response matches the original challenge string, the authentication is successful as indicated by an operation 421. Otherwise, the authentication is not successful as indicated by an operation 423.

The authentication system of the present invention provides the benefits of a strong two-factor authentication process without the need to deploy complex and expensive PKI infrastructure. For example, with the present invention, a Certificate Authority is used to provision the authentication card with anonymous certificates prior to distribution to an entity that will deploy the authentication system. However, capability to later access the Certificate Authority is not required to be deployed with the authentication card. Thus, the present invention avoids having to deploy expensive and complex Certificate Authority access capability normally required by conventional PKI infrastructure. Additionally, the authentication card of the present invention represents a secure and portable token. Thus, the authentication card of the present invention avoids having to maintain authentication credentials on a single client exposed to a network. The two-factor authentication process of the present invention provides end-to-end secure digital identity, thus greatly reducing vulnerability of networked digital assets. It should be appreciated that the authentication system, including the authentication card, of the present invention can be implemented within the Java Card Enterprise Software framework. Thus, the present invention provides a low cost/low complexity solution for strong two-factor authentication without a need for PKI deployment.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An authentication system, comprising:
   an authentication card having a unique identifier, the authentication card being configured to include a private portion of an authentication keypair and an anonymous authentication certificate;
   a card reader capable of interfacing with the authentication card, the card reader being configured to access information stored on the authentication card;
   a client computing system connected to communicate with the card reader; and
   a server computing system connected to communicate with the client computing system, the server computing system including a memory having a user record stored therein, the user record including the unique identifier of the authentication card, a user name assigned to the authentication card, and the anonymous authentication certificate of the authentication card having a public portion of the authentication keypair, wherein the anonymous authentication certificate is stored on the authentication card during provisioning of the authentication card and is placed in the user record in association with the unique identifier of the authentication card during a user enrollment process that links the user name to the anonymous authentication certificate,
   wherein the presence of the anonymous authentication certificate in the user record enables the server computing system to authenticate the authentication card without communication with an external certificate authority,
   wherein the server is configured to transmit a challenge string to the authentication card, the authentication card being configured to encrypt the challenge string using the private portion of the authentication keypair and transmit the encrypted challenge string to the server as a response, the server being configured to decrypt the response using the public portion of the authentication keypair, the server being further configured to determine if the decrypted response matches the challenge string transmitted to the authentication card.

2. An authentication system as recited in claim 1, wherein the authentication card is configured to require successful entry of a personal identification number (PIN) by a user to access information included in the authentication card.

3. An authentication system as recited in claim 1, wherein an absence of the anonymous authentication certificate in the user record on the server computer system causes a failed authentication.

4. An authentication system as recited in claim 1, wherein the authentication card is further configured to include one or more applets and a virtual machine to execute the one or more applets, wherein the one or more applets are defined to direct authentication operations.

5. A method for establishing an authentication system, comprising:
   prior to activating an authentication card for runtime use, provisioning an authentication card having a unique identifier with a private portion of an authentication keypair and an authentication certificate including a public portion of the authentication keypair;
   prior to activating the authentication card for runtime use, assigning the authentication card to an entity having a user record in an identity server;
   prior to activating the authentication card for runtime use, storing the unique identifier of the authentication card in the user record of the entity to which the authentication card is assigned;
   prior to activating the authentication card for runtime use, extracting the authentication certificate from the authentication card;
   prior to activating the authentication card for runtime use, storing the extracted authentication certificate in the user record of the entity to which the authentication card is assigned, wherein the authentication certificate extracted from the authentication card is the only authentication certificate allowed to be stored in the user record; and
   activating the authentication card for runtime use.

6. A method for establishing an authentication system as recited in claim 5, wherein activating the authentication card for runtime use includes setting a personal identification number (PIN) in the authentication card, the PIN enabling access to information contained within the authentication card.

7. A method for establishing an authentication system as recited in claim 5, wherein provisioning the authentication card is completed prior to distribution of the authentication card to an end-user.

8. A method for establishing an authentication system as recited in claim 5, wherein provisioning the authentication card includes storing one or more applets on the authentication card, the one or more applets being defined to direct authentication operations.

9. A method for establishing an authentication system as recited in claim 5, wherein the authentication certificate is defined as an anonymous certificate keyed to the unique identifier of the authentication card.

10. A method for establishing an authentication system as recited in claim 5, wherein the authentication certificate is an x.509 certificate.

11. A method for performing authentication, comprising:
sending a challenge string from a server to an authentication card;
using a private key on the authentication card to encrypt the challenge string;
sending the encrypted challenge string as a response from the authentication card to the server;
correlating a unique identifier of the authentication card to a user record residing at the server to obtain an authentication certificate including a public key from within the user record;
using the public key from the authentication certificate to decrypt the response at the server; and
determining if the decrypted response matches the challenge string as sent from the server to the authentication card, wherein a successful match results in a successful authentication and an unsuccessful match results in an unsuccessful authentication.

12. A method for performing authentication as recited in claim 11, wherein using the public key from the authentication certificate is not contingent on validation of the authentication certificate with a Certificate Authority.

13. A method for performing authentication as recited in claim 11, wherein the authentication certificate is defined as an anonymous certificate keyed to the unique identifier of the authentication card.

14. A method for performing authentication as recited in claim 11, wherein using the private key on the authentication card to encrypt the challenge string is directed by an applet executing within the authentication card.

15. A method for performing authentication as recited in claim 11, wherein the authentication certificate is an x.509 certificate.

16. A method for performing authentication as recited in claim 11, further comprising:
revoking an authentication privilege by removing the authentication certificate from the user record residing at the server.

17. A method for performing authentication as recited in claim 11, further comprising:
establishing an interface between the authentication card and the client; and
supplying a correct personal identification number (PIN) to enable access to information stored in the authentication card.

18. A data storage device including program instructions for performing authentication, comprising:
program instructions for sending a challenge string from a server to an authentication card;
program instructions for using a private key on the authentication card to encrypt the challenge string;
program instructions for sending the encrypted challenge string as a response from the authentication card to the server without sending an authentication certificate of the authentication card to the server;
program instructions for correlating a unique identifier of the authentication card to a user record residing at the server to obtain the authentication certificate including a public key from within the user record;
program instructions for using the public key from the authentication certificate to decrypt the response at the server; and
program instructions for determining if the decrypted response matches the challenge string as sent from the server to the authentication card, wherein a successful match results in a successful authentication and an unsuccessful match results in an unsuccessful authentication.

19. A data storage device including program instructions for performing authentication as recited in claim 18, wherein the program instructions for using the public key from the authentication certificate do not include program instructions for validating the authentication certificate with a Certificate Authority.

20. A data storage device including program instructions for performing authentication as recited in claim 18, wherein the authentication certificate is defined as an anonymous certificate keyed to the unique identifier of the authentication card.

21. A data storage device including program instructions for performing authentication as recited in claim 18, wherein the program instructions for using the private key on the authentication card to encrypt the challenge string are defined within one or more applets capable of being executed on the authentication card.

22. A data storage device including program instructions for performing authentication as recited in claim 18, wherein the authentication certificate is an x.509 certificate.

23. A data storage device including program instructions for performing authentication as recited in claim 18, further comprising:
program instructions for concluding the authentication process in an unsuccessful state upon recognizing an absence of the authentication certificate within the user record residing at the server.

24. A data storage device including program instructions for performing authentication as recited in claim 18, further comprising:
program instructions for requiring a correct personal identification number (PIN) to be supplied to enable access to information stored in the authentication card.

25. An authentication system, comprising:
means for sending a challenge string from a server to an authentication card;
means for using a private key on an authentication card to encrypt the challenge string;
means for sending the encrypted challenge string as a response from the authentication card to the server without sending an authentication certificate of the authentication card to the server;
means for correlating a unique identifier of the authentication card to a user record residing at the server to obtain the authentication certificate including a public key from within the user record;
means for using the public key from the authentication certificate to decrypt the response at the server; and
means for determining if the decrypted response matches the challenge string as sent from the server to the authentication card, wherein a successful match results in a successful authentication and an unsuccessful match results in an unsuccessful authentication.

* * * * *